April 11, 1967   W. D. CARSON ET AL   3,313,033
STORAGE BATTERY

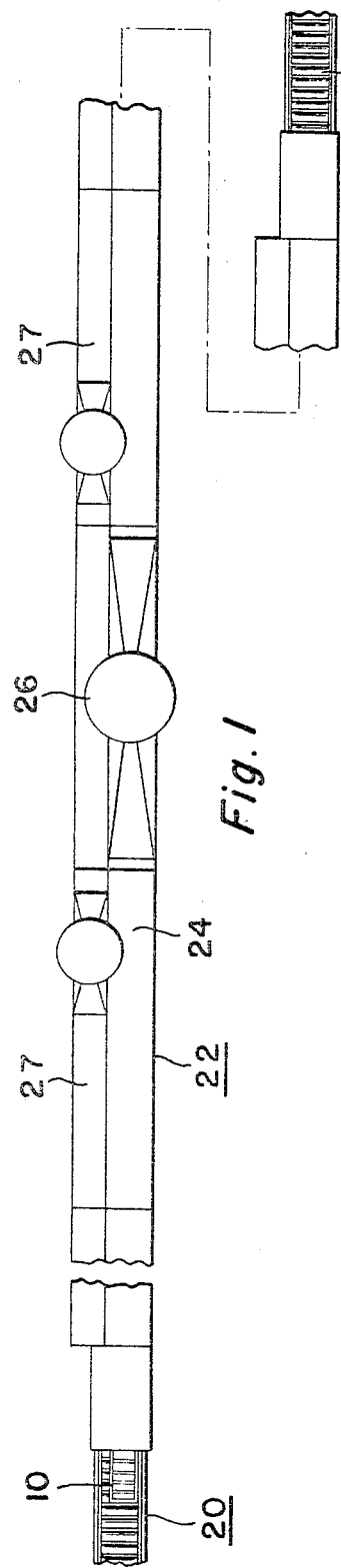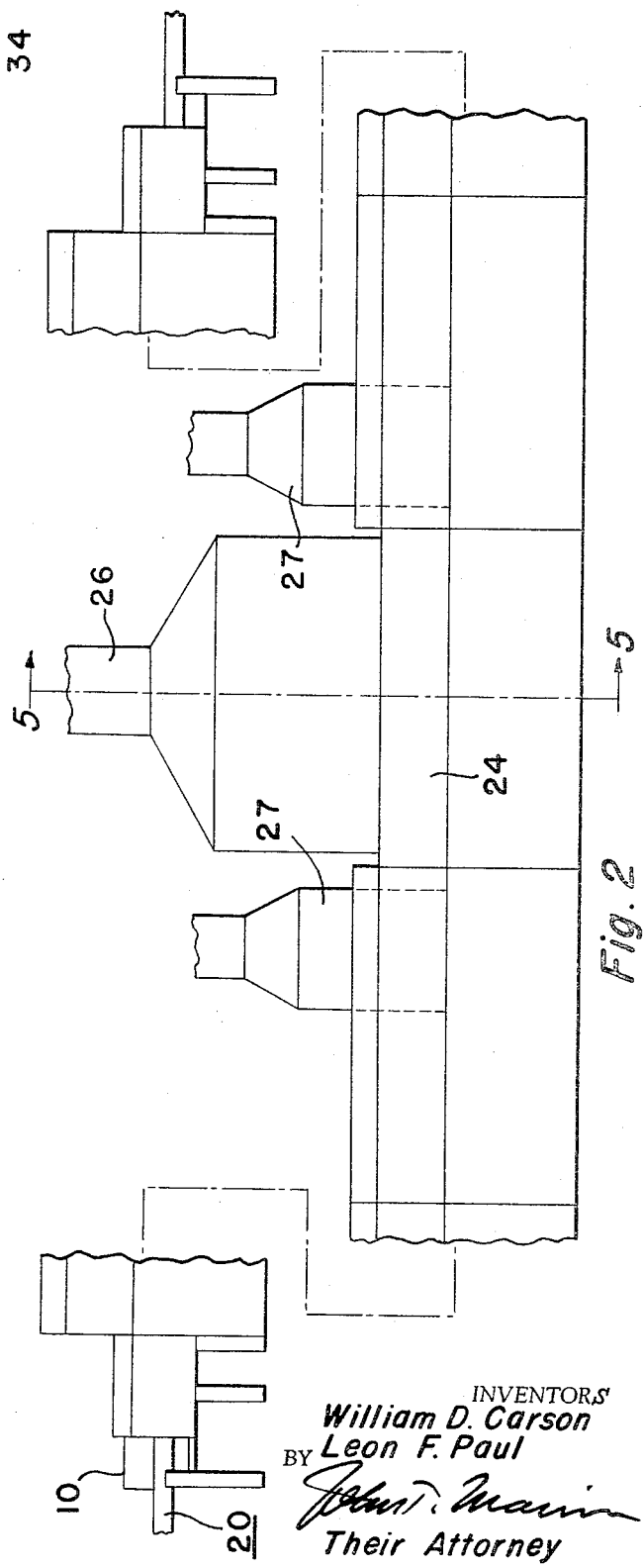

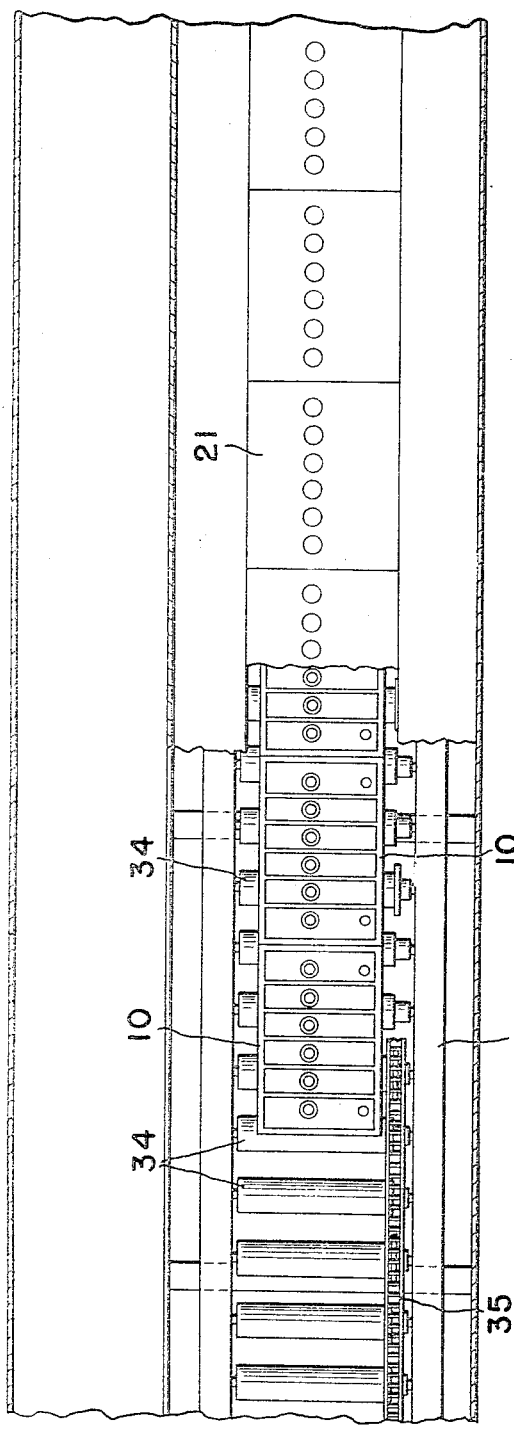
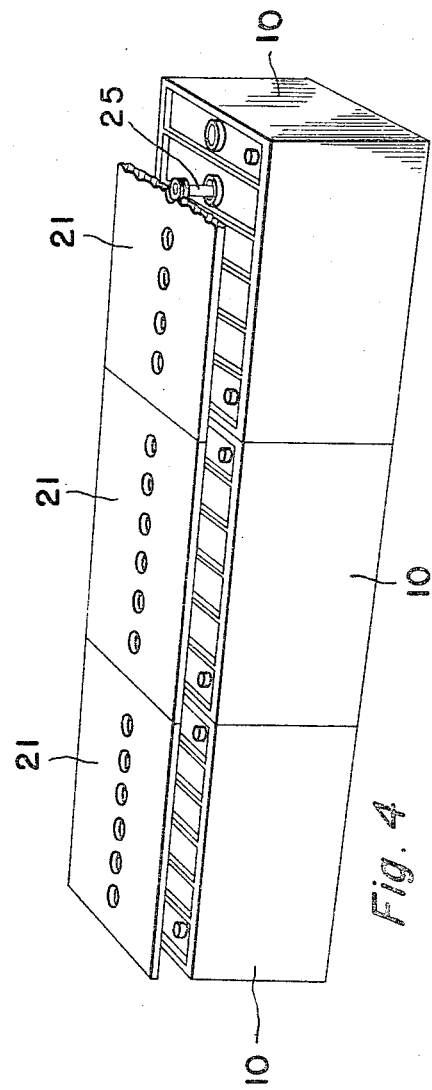

Filed Nov. 19, 1965   3 Sheets-Sheet 3

INVENTORS
William D. Carson
Leon F. Paul
BY

Their Attorney

United States Patent Office 3,313,033
Patented Apr. 11, 1967

3,313,033
STORAGE BATTERY
William D. Carson and Leon F. Paul, Muncie, Ind., assignors to General Motors Corporation, Detroit, Mich., a corporation of Delaware
Filed Nov. 19, 1965, Ser. No. 508,757
10 Claims. (Cl. 34—21)

This invention relates to lead acid storage batteries and is particularly concerned with the drying of fully charged, washed, and assembled storage battery elements within the battery case.

The manufacture of dry charged storage batteries creates economic problems in the drying of plate assemblies after they have been charged. If these plate assemblies are not thoroughly dried after charging the battery loses its charge during storage and, upon subsequent addition of battery acid, is incapable of performing the desired functions.

Until now the only satisfactory method for producing dry charge battery assemblies was to process each cell group or assembly separately. Under the prior art procedures, the cell groups which comprise positive and negative plates with separators therebetween were immersed in battery acid, charged, washed free from acid and were then placed in a heating chamber and dried in a monoxidizing atmosphere. Thereafter, the cell groups, in dried condition, were assembled into battery cases, sealed and connected electrically.

This prior process was not only costly but in many instances the dried and charged cell assemblies were injured during the assembly thereof into the case due to the compression necessary to fit each cell group within its cell compartment, separators in some instances were displaced during the various operations and in general the entire procedure was tedious and costly.

The present invention is directed to a method for charging completely assembled storage battery units wherein the individual cell groups in each battery, with the cell covers in position but not sealed to the case, are connected to one another and charged as a unit. The acid is thereafter dumped from the battery cell compartments, the cell groups while in position are thoroughly washed and subsequently dried in the case under controlled conditions and the covers are sealed in place to produce a dry charged unit at a greatly reduced cost and with much less opportunity for damage to the cell groups.

This invention is specifically directed to the drying of storage batteries having conventional inter cell connections between the several cell groups. In copending application Ser. No. 508,758, filed concurrently herewith, an apparatus and method for drying assembled batteries is described and claimed wherein the cell groups are connected through the cell walls.

It is, therefore, the main object of the present invention to provide a method and apparatus for drying completely a plurality of charged wet cell groups within a battery case wherein the cell groups are electrically connected one to another by means of permanent connectors and wherein the covers for the individual battery cells are sealed to the case after the drying operation is completed.

In carrying out this object, it is a further object to continuously inject hot nonoxidizing gases into the wet cell assemblies having a dew point preferably of from 120° F. to 140° F. over an extended period wherein the gas is supplied from nozzles passing directly into each battery cell compartment through the filler openings in the cover whereby the gas is directed into the battery cell compartments at high velocity and at elevated temperature.

In carrying out this object, it is a further object to supply the gas for drying the battery at velocities from 12,000 ft. per minute to 40,000 ft. per minute, and preferably in the order of 21,000 ft. per minute.

A further object of the invention is to provide a method for drying battery plate cell assemblies in assembled condition within a battery case wherein the drying is accomplished through the use of hot, relatively dry, high velocity nonoxidizing atmosphere which penetrates into each battery cell and which is driven through the separators and plate assemblies to eliminate moisture therefrom.

Further objects and advantages will be apparent, reference being had to the accompanying drawings wherein preferred embodiments of the present invention are clearly shown.

In the drawings:

FIG. 1 is a plan view of a drying oven;

FIG. 2 is a side elevation of the drying oven shown in FIG. 1;

FIG. 3 is a view partially cut away of the positive plenum chamber showing some batteries in position on the conveyor and also showing some of the nozzles and fixtures used in connection with the drying step;

FIG. 4 is a view in perspective showing the relative position of the nozzle carrier and the batteries with which these cooperate;

Figure 5:
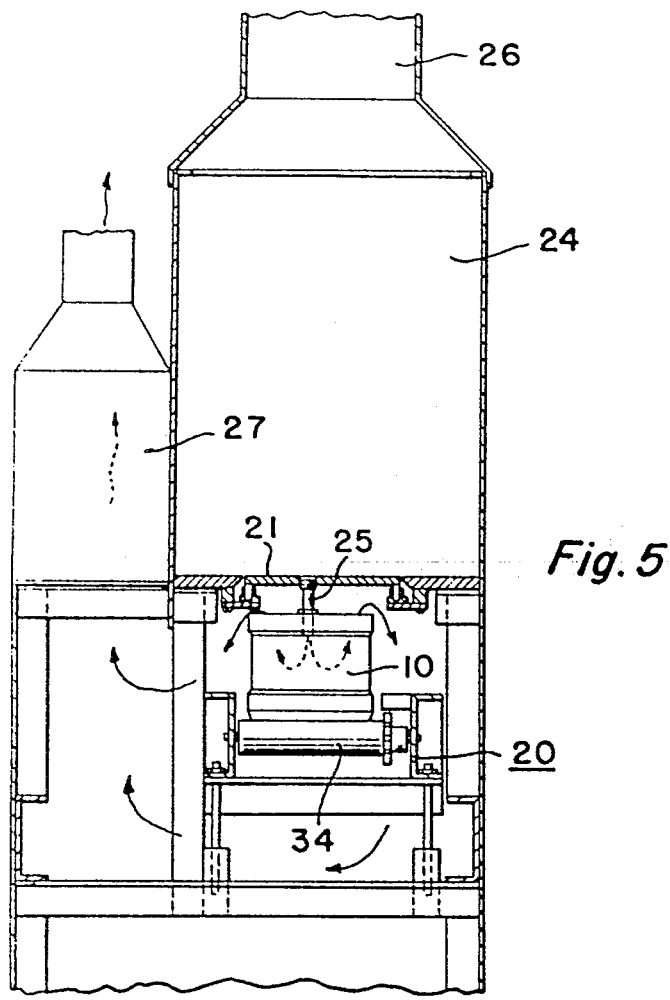
FIG. 5 is a section taken on line 5—5 of FIG. 2 showing an end view showing the oven with a battery in place upon the conveyor within the positive plenum chamber.

In the manufacture of dry charged storage batteries of the type described, the cell groups are assembled in storage battery cases, the covers are loosely put in place and the external electrical connections are made between the several cells. In a 12-volt battery, for example, there are six cells and six cell groups with the end cells, each carrying one of the battery terminals and with the intermediate cells connected in series therebetween. In this type of battery the cell covers for each cell are loosely in place during charging and drying and sealed to the battery case after the battery is fully charged and dried, to complete the battery assembly.

In the charging of such batteries, the battery cell compartments with the cell groups therein are filled with battery acid and are connected in a charging circuit generally in series with a number of other batteries. The batteries are fully charged and then the acid is dumped therefrom and the cell groups and compartments are washed by passing the batteries through a washing apparatus which completely eliminates the battery acid from the interstices of the plates or separators. Generally, the washing consists of 14 successive washes with water ranging in temperature from 140° F. to 110° F., together with a final wash of cold tap water. Between each wash, the wash water in the batteries is dumped and the batteries are held in a partially inverted position to drain the wash water therefrom. Each drain requires about 45 seconds except for the final drain wherein a four minute period is used to eliminate all water from the battery cell compartments and cell assemblies that will drain therefrom by gravity. The loose cell covers facilitate the washing operation as well as the subsequent drying operation.

Thereafter, the charged, washed and drained batteries 10 are positioned on a conveyor 20 shown in FIG. 1 at the left hand side of the figure. These batteries then pass into the drying oven 22 through the positive plenum chamber 24 thereof. The conveyor passes completely through the chamber 24 and emerges therefrom at the right hand end at which time the batteries 10 together with cell group assemblies 12 are completely dried. As the batteries 10 are placed upon the conveyor 20, covers 21 are positioned upon a track 23 above the conveyor 20. The covers 21 each consist of a plate of metal, preferably aluminum, which is apertured and which carried a plurality of depending nozzles 25. The nozzles 25 consist of tubes which are spaced along the cover 21 so as to extend into the filler openings of each cell in a battery 10 with which a given cover 21 cooperates. Each tube 25 has a bore of about 1/4" and one cover 21 is preferably provided for each battery although this is merely a matter of convenience.

The positive plenum chamber 24 is supplied hot gases through a duct 26 at the center of the chamber. These recirculating gases pass and are supplemented by a direct gas fired burner adjusted so as to produce an atmosphere containing not over .2% oxygen, 2–5% carbon monoxide and 8–11% carbon dioxide. This atmosphere is moved from the burner to the positive plenum chamber 24 of the oven 22 by a centrifugal blower which is capable of supplying large quantities of the nonoxidizing atmosphere at high velocity. The gas is supplied to chamber 24 at a temperature of from 240–250° F. with a dew point of 130° F. ±10.

Figure 6:
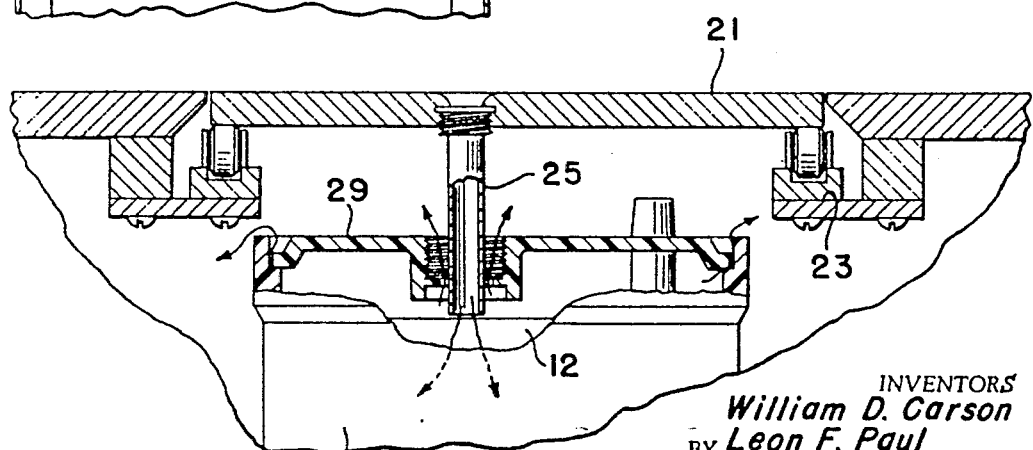
FIG. 6 is a view in section taken through a nozzle as it extends into a battery cell compartment while the battery is on the conveyor as shown in FIG. 5.

The chamber 24 is closed at the lower side thereof by the covers 21 which abut and form a substantially continuous wall which extends the entire length thereof. The only passage through the covers 21 is provided by the nozzles 25 which are fixedly positioned to the covers 21. The nozzles 25, as will be seen in FIGS. 5 and 6, extend directly into the individual cell compartments of the batteries on the conveyor 20 which is formed from a plurality of rotatable free rollers 34. The rollers 34 are slightly longer than the width of the widest battery case to be passed through the oven and are thus capable of accommodating a full range and variety of battery cases. It will also be noted that the nozzles 25 on the covers 21 are engaged with the batteries by means of the nozzles extending into the cell compartments through the filler openings in the cell covers 29 for the cell compartments. The covers 29 are not sealed at this point and permit gas to flow outwardly around their peripheries. Thus, the batteries 10 are moved along the conveyor 20 by their associated plates 21 which are power indexed, or motivated by other suitable means. The wide conveyor rollers permit the use of the drying apparatus in connection with a number of different size batteries 10 which may be run simultaneously and intermingled one with the other without difficulty which adds to the flexibility of the apparatus. If all batteries were of identical height, the nozzles 25 could be positioned within about 1/8" from the top of the battery plate assembly, however, it is only necessary that the nozzles 25 extend into the cell compartment and through the filler openings so that the depth of penetration is of no great importance which adds to the flexibility of the apparatus whereby the same covers 29 may be used for a wide range of battery sizes.

As the batteries 10 move along the conveyor 20 toward the right hand end of the oven chamber 24, the hot gases from the positive plenum chamber 24 pass through the nozzles 25 and are driven into the cell compartments and between the plates and separators to evaporate the moisture therein and thus dry completely the cell assemblies. The continuous action of forced gas drying of the cell groups with sufficient pressure to drive the hot, dry gases in between the plates and separators and into and through the interstices thereof is of great importance for we have found that it is important that high velocity is maintained throughout this drying process. We prefer to use a nozzle velocity of about 21,000 ft. per minute which is accomplished by maintaining a positive plenum pressure of about 16 oz. per square inch in this specific embodiment. The apparatus is completely functional within the preferred range of velocities of from 20,000 to 22,000 feet per minute and up as high as 40,000 feet per minute. Drying may also be obtained at velocities down to 12,000 feet per minute although longer periods of time are required in order to obtain satisfactory drying. The gas that is forcibly blown into each cell compartment acts to eject residual gas from the cell compartments around the loosely fit cell covers 29 of the batteries and this residual gas which is cooled and moisture laden is then forced into the negative plenum chamber 27 as shown by the arrows in FIGS. 5 and 6. The negative plenum chamber 27 recirculates the return gas through a condenser which is cooled so as to reestablish the dew point of the gas to within the range of about 120° F. to 140° F. whereupon the gas is recirculated through the blower and is reheated and supplemented by fresh monoxidizing atmosphere from the burner. Thus, the process is a continuous one wherein close control of the dew point of the drying gas is maintained at all times and wherein the high velocity of the drying gas is a basic and important factor in the drying of the assembled cell groups within their cases.

We have found that with a drying chamber 22 about 110 feet long and utilizing 720 nozzles having outlets 1/4" in diameter with the nozzles spaced 1 5/8" apart, that the rate of movement of batteries on the conveyor should be adjusted so that each battery is within the drying zone for a minimum of 90 minutes, this time figure being directed to batteries with microporous rubber separators therein. In this connection, the nonoxidizing gas is supplied at about 250° F. with a nozzle velocity of 21,000 ft. per minute at a dew point of 130° F. ±10° F. with an atmosphere having a nominal analysis of Oxygen less than 0.2 of 1%
$CO_2$—about 10%
CO—about 2.5%
$N_2$—the remainder For batteries having paper separators, the period of time may be cut down considerably to in the order of from 20 to 30 minutes since the paper separators dry more readily. In any event, the index speed should always be adjusted so that the plates and separators are completely dry when any battery leaves the drying oven.

The batteries, upon leaving the oven, should have the battery covers 21 sealed thereto and vent caps put in place immediately. If the covers are not sealed to the battery case immediately, it is possible to store the batteries in dried condition at an ambient temperature of between 105° F. and 120° F. provided the relative humidity of the surrounding atmosphere is maintained at not in excess of 35%. However, in most instances, the covers should be sealed into place with the vents sealed as quickly as possible to prevent any moisture pick-up by the dried plates and separators.

We consider the high velocity nozzles directing drying atmosphere into the cell compartments and between the plates the major factor to the success of this invention. We have found that it is impractical to dry battery assemblies in the case satisfactorily unless the drying atmosphere is injected into the cell compartments at a high velocity whereby the atmosphere is forced between the plates and separators and into the interstices thereof to provide complete drying of the same. As mentioned heretofore, velocities of less than 12,000 feet per minute do not provide acceptable drying since the time period to obtain complete drying is excessive and too costly and wherein in many instances, due to the lower velocities, it is impossible to fully dry the plates and separators adjacent the bottom of the case.

The gas booster may be of any satisfactory design and in this connection, a high pressure centrifugal fan is used to produce the high velocity supply of atmosphere. This is preferably of a squirrel cage design capable of moving large volumes of air in order to obtain the desired velocities through the nozzles.

While the embodiments of the present invention as herein disclosed constitute preferred forms, it is to be understood that other forms might be adopted.

What is claimed is as follows:

1. In a method for drying a plurality of unsealed battery assemblies, each consisting of a battery case having a plurality of contiguous unsealed compartments wherein each compartment includes a wet, fully charged battery plate assembly consisting of positive and negative battery plates spaced from one another by permeable separators and connected electrically to the battery plate assembly in the next adjacent compartment, and wherein the individual unsealed cell covers each having a filler opening therethrough are in place on each compartment, the steps comprising; providing a plurality of said battery assemblies along a conveyor, inserting a nozzle through each filler opening, blowing hot, dry, non-oxidizing gas at high velocity through said nozzles into said plate assemblies whereby the battery plate assemblies are progressively dried by said gas and continuously forcing cooled, less dry gas from said assemblies around said unsealed covers, and continuing the procedure until said battery plates are dried.

2. In a method for drying a plurality of wet, fully charged battery plate assemblies, permanently electrically connected together and contained within a plurality of contiguous cell compartments within an unsealed battery case, the steps comprising; inserting a nozzle into each cell compartment, continuously blowing high velocity, hot, dry non-oxidizing gas into said case through said nozzles so that the gas is driven between the components of the battery plate assemblies, continuously forcing cooled, less dry gas from each compartment through pressure created by the incoming gas, and continuing said procedure until the battery plate assemblies in said case are completely dry.

3. In a method for drying a plurality of wet, fully charged battery plate assemblies, permanently electrically connected together and contained within a plurality of contiguous unsealed compartments in a battery case, the steps comprising; providing a nozzle for each cell compartment, inserting said nozzles into said cell compartments, continuously blowing high velocity, hot, dry, non-oxidizing gas into said compartments through said nozzles and between the components of the battery plate assemblies, continuously forcing cooled, less dry gas from said compartments at a point remote from said nozzles, drying and reheating said withdrawn gas, and then recirculating the same through said nozzles while simultaneously adding make up hot dry gas to maintain the volume thereof.

4. The method as claimed in claim 3 wherein said withdrawn gas is reheated and then recirculated through said nozzles.

5. The method as claimed in claim 3 wherein the velocity of the gas coming from said nozzles is in the order of above 12,000 feet per minute.

6. The method as claimed in claim 5 wherein the velocity of the gas coming from said nozzles is preferably in the order of above 21,000 feet per minute.

7. The method as claimed in claim 3 wherein the gas is supplied at a temperature of about 250° F. with a dew point of 130° F. ±10°.

8. The method as claimed in claim 6 wherein the said gas is maintained at a temperature of about 250° F. with a dew point of about 130° F. ±10°.

9. Apparatus for drying open top battery assemblies each consisting of an unsealed battery case having a plurality of contiguous compartments therein wherein each compartment includes a fully charged battery plate assembly comprising; a conveyor for carrying batteries in a longitudinal direction, confining means for said conveyor forming a longitudinally extending chamber which is connected to an outlet duct, a plurality of spaced constricted openings in said chamber and above said conveyor each consisting of an elongated nozzle adapted for insertion into a battery case compartment and adapted to direct gas into said compartments, an inlet duct connecting all of said elongated openings, and means for supplying hot dry gas under pressure to said inlet duct whereby the gas is directed through said openings toward said conveyor and is subsequently drawn into said outlet duct.

10. Apparatus as claimed in claim 9 wherein the system is a closed system including a gas generator and fan between the outlet duct and the inlet duct.

References Cited by the Examiner

UNITED STATES PATENTS

| 2,702,435 | 2/1955 | Pinney | 34—105 |
| 2,891,319 | 6/1959 | Beyol | 34—21 |
| 2,911,457 | 11/1959 | Sabatino | 34—224 X |

KENNETH W. SPRAGUE, *Primary Examiner.*